June 22, 1965  V. L. OTT ETAL  3,190,479
HAND TRUCKS
Filed Dec. 27, 1962  2 Sheets-Sheet 1
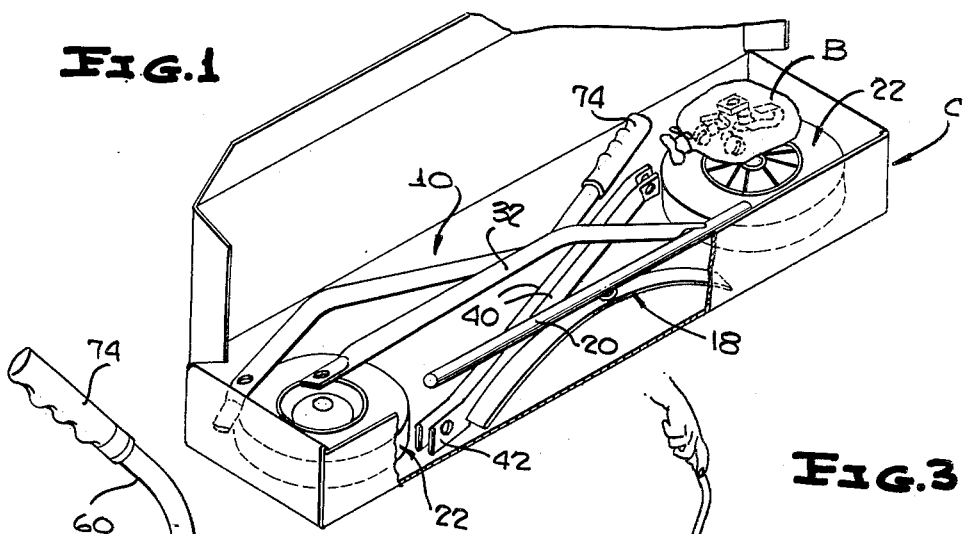
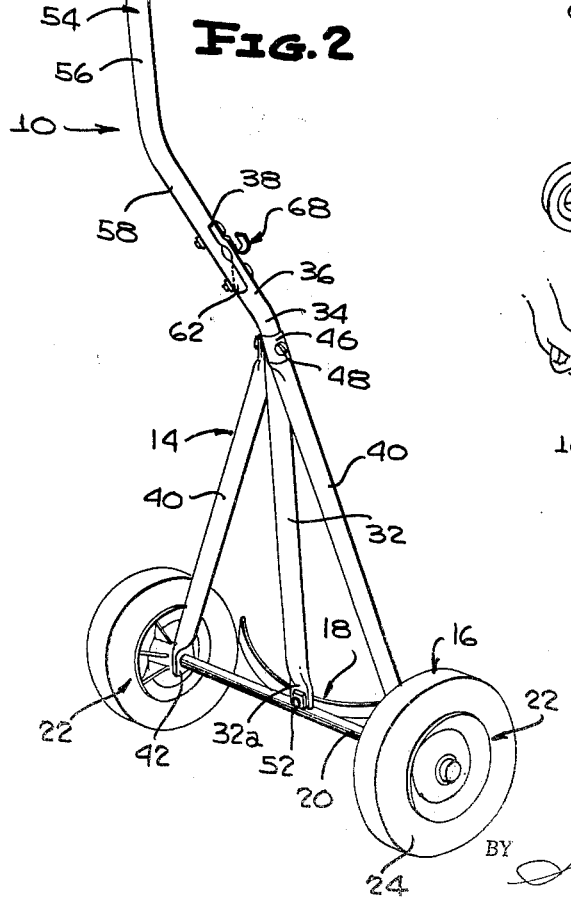
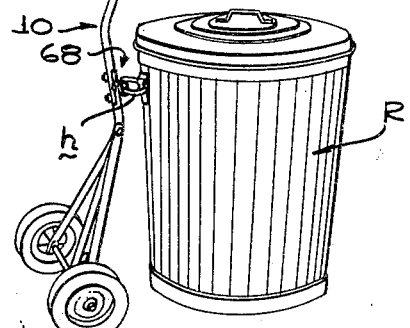
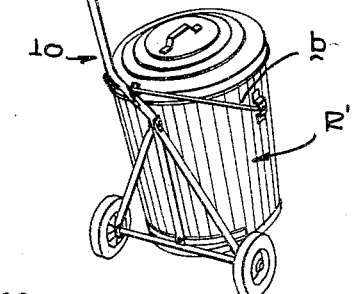
INVENTORS
VIVIAN L. OTT &
JOHN BRANCH BEAMAN, Jr.
BY Shoemaker and Mattere
ATTORNEYS

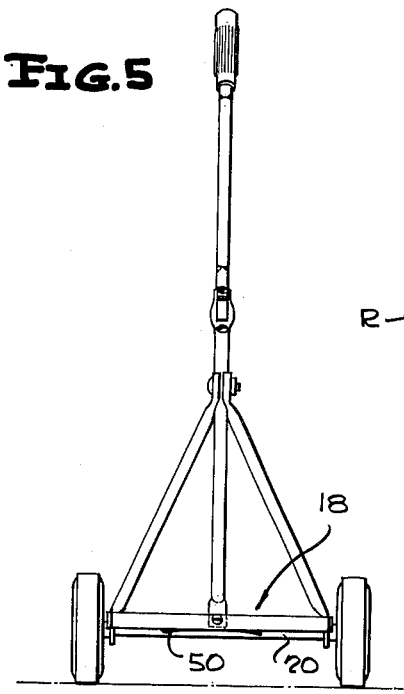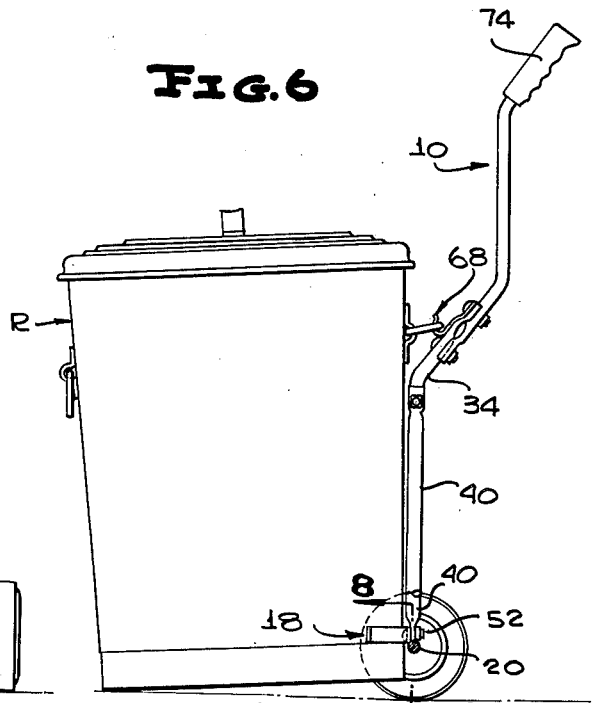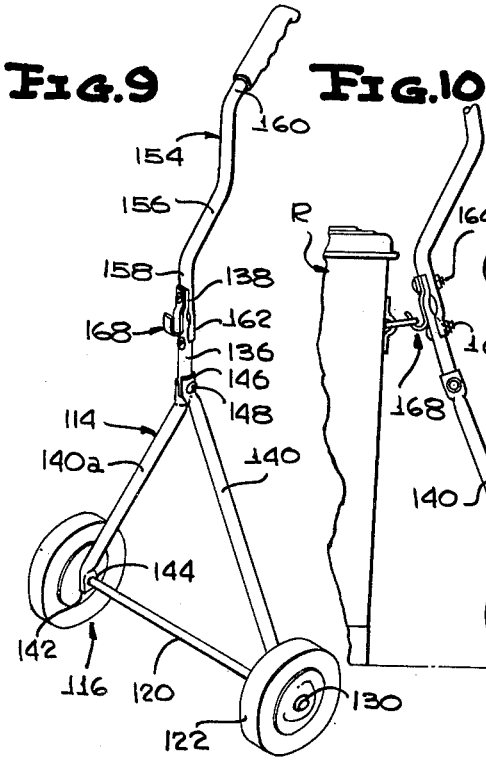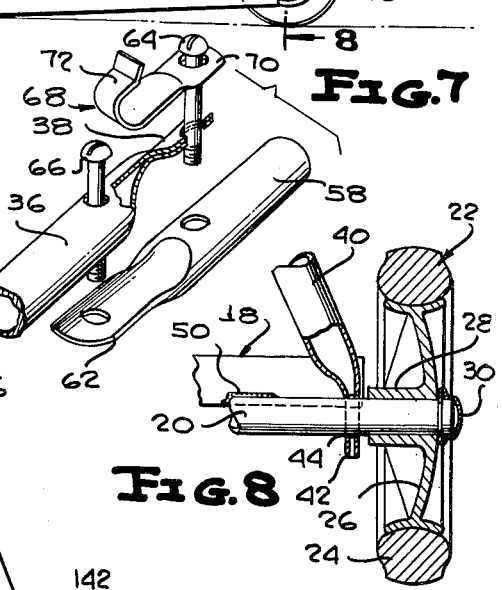

* United States Patent Office 3,190,479
Patented June 22, 1965

3,190,479
HAND TRUCKS
Vivian L. Ott, 6100 Sylvan Ave., Norfolk, Va., and John Branch Beaman, Jr., 815 Church St., Ahoskie, N.C.
Filed Dec. 27, 1962, Ser. No. 247,651
3 Claims. (Cl. 214—373)

This invention relates to improvements in hand trucks and is directed particularly to a new hand truck construction for lifting and transporting receptacles, more especially a receptacle having a bail handle.

In the management of a home, a small apartment or a small business, use is made of pails, buckets or other receptacles having bail handles and such receptacles, particularly when they are of a fairly large size, such as large garbage pails and the like, are heavy when filled and are inconvenient to manage particularly where they may have to be carried for some distance.

It is accordingly an object of the present invention to provide a novel two wheel hand truck by means of which such a receptacle may be readily picked up and transported from one place to another with a minimum of effort.

It is another object of the invention to provide a hand truck which may be used for picking up and transporting a receptacle of the character referred to, in such a manner as to maintain the receptacle steady or against lateral movement so that the danger of spilling the contents thereof is avoided.

A still further object of the invention is to provide a hand truck of the character stated which is of lightweight but strong and durable construction and in which the light frame thereof is so designed that it will not twist or bend under strains imposed thereon in the operation of lifting and transporting fairly heavy loads.

Still another object of the invention is to provide a novel hand truck structure designed so that it may be readily packaged or put up in a dis-assembled condition in a suitable carton whereby such carton or a number of such cartons containing the dis-assembled truck structure may be readily stored in a stock room ready to be delivered to a customer and wherein further the dis-assembled structure is so designed that a customer can easily and quickly assemble the parts with a minimum of effort and without requiring special tools other than a screw-driver and small wrench.

Another and more particular object of the invention is to provide in a lightweight hand truck designed to be sold in knocked-down condition, a novel means of coupling together certain sections of the structure whereby the structure will be made strong and rigid in the coupling area to withstand strains applied thereto through the medium of a supporting hook secured in the coupling area and designed to take the weight of a receptacle as it is lifted onto and supported by the truck structure.

Other objects and advantages of the invention will become apparent as the description of the same proceeds and the invention will be best understood from a consideration of the following detailed description taken in connection with the accompanying drawings wherein:

FIG. 1 is a view in perspective of a box or carton, with portions thereof broken away, showing therein a dis-assembled truck designed according to one embodiment of the present invention.

FIG. 2 is a view in perspective of a hand truck assembled from the parts shown in the carton in FIG. 1.

FIG. 3 is a view in perspective showing the position of the truck shown in FIG. 2 preparatory to picking up a receptacle such as an ash can in which there are the conventional loop handles on the sides thereof.

FIG. 4 is a view in perspective showing the hand truck in position for transporting a bucket having a bail handle and showing the bail handle engaged with the supporting hook.

FIG. 5 is a view in front elevation of the truck structure illustrated in the preceding figures.

FIG. 6 is a view in side elevation of the truck structure showing the position of a can ready to be lifted from the ground and showing the near one of the truck wheels removed to illustrate the engagement of the can with the supporting cradle.

FIG. 7 is an exploded perspective view showing the novel reinforced joint between the handle bar and a part of the frame.

FIG. 8 is a sectional detail on an enlarged scale taken substantially on the line 8—8 of FIG. 6.

FIG. 9 is a view in perspective of another embodiment of the invention.

FIG. 10 is a view in side elevation of the second embodiment showing the position of the same preparatory to picking up a can, with the can partly broken away and with parts of the truck structure broken away.

Referring now particularly to the drawings it will be seen that two exemplifications of the invention are disclosed, one of which is generally designated 10 while the other one is generally designated 12.

The invention according to the first example or embodiment wherein the structure is generally designated 10, is illustrated in dis-assembled condition with the parts thereof assembled in a box or carton which is generally designated C, whereby the truck structure can be readily stored and is ready for transmittal to a purchaser who may subsequently assemble the parts.

The structure 10 when the assembled parts are coupled together is illustrated ready for use and in use in FIGS. 2 to 6 inclusive and as illustrated the structure comprises a frame which is generally designated 14, supporting running gear therefor which is generally designated 16, and a cradle unit generally designated 18 for maintaining a supported receptacle in proper position for transportation as illustrated, for example, in FIG. 4.

As shown, the running gear 16 comprises an axle 20 having rotatably supported on each end, a wheel 22. While any suitable form of wheel may be employed it is preferred that the wheel have a rubber tire 24 mounted upon a suitable disc body 26 having a hub 28 through which extends an end of the axle 20 as illustrated. The disc body portion 26 and hub 28 may be cast or molded in one piece of a suitable material such, for example, as a suitable type of plastic although it is to be understood that the invention is not limited to the use of this material.

Each end of the shaft may have secured thereon a hub cap 30 of suitable design. Such cap may be press fitted on the end of the shaft or it may be secured by a set screw or in any other desired manner.

The frame 14 comprises a tubular center bar 32 which is straight through the major portion of its length from the lower end which is fixed to the axle 20, in the manner about to be described, to a point adjacent to its upper end where it is bent or curved as indicated at 34 to form a short terminal upper portion 36. This upper portion 36 terminates in the short tranversely arcuate channeled portion 38.

The frame 14 also includes the two upwardly convergent bars 40, preferably of tubular material, which connect the upper end of the center bar 32 with the axle 20 at the outer ends of the latter.

As shown each of the bars 40 has a flattened lower end portion 42 which has an aperture 44 therethrough, through which the axle 20 passes. The flattened portion 42 of each bar 40 is disposed in opposed relation to and may be engaged by the inner end of the hub 28 of an adjacent wheel.

The upper ends of the bars 40 are formed to have a transversely curved or arcuate and longitudinally channeled terminus 46 and each of these portions is positioned against a side of the upper end of the bar 32 and a securing element 48 in the nature of a bolt, pin or the like, is passed transversely through the portions 46 and through the bar 32.

It will be seen from the foregoing that the frame structure 14 defines, with the axle 20, a triangle, and in this first embodiment of the invention the triangle is divided centrally by the vertical bar 32.

The lower end of the vertical bar 32 is fixed to the axle. In the construction here illustrated, the attachment of the lower end of the bar 32 to the axle, is by means of the arcuate cradle 18. This cradle is formed from a suitable length of flat bar material which is attached mid-way of its ends to the axle 20, in a suitable manner as by welding or the like. The lower edge of the cradle bar rests upon the forward upper side of the axle and the axle and lower edge of the cradle are welded together as indicated at 50 and the cradle bar thus stands above the axle and the lower end of the bar 32, which is flattened as indicated at 32a, is positioned against the rear side of the cradle bar and a bolt 52 is passed through the two bars in the manner illustrated. This is a preferred construction or manner of coupling the cradle bar and the frame bar together and attaching the frame bar to the axle. However it will be readily apparent that other suitable means may be employed for securing the lower end of the frame bar 32 to the axle.

The cradle bar is attached to the axle so that the concave side of the arc which it defines is directed forwardly and the length of the cradle bar is such that the ends thereof will be disposed in close proximity to the inner sides of the wheels 22.

Numeral 54 generally designates a handle bar. This handle bar has a short middle portion 56 and two oppositely angled end portions 58 and 60. The handle bar thus has substantially an ogee curve, when viewed in side elevation.

The lower end portion 58 of the handle bar has the short longitudinal part 62 of arcuate cross section and is thus longitudinally channeled.

The upper end of the frame bar and the end portion 58 of the handle bar are joined together to form a strong rigid coupling by placing the end portions 36 and 58 in overlapping relation, as illustrated, so that the channel part 62 of the handlebar partially encircles the underside of the upper end portion 36 of the frame bar and the channeled terminal portion 38 of the frame bar lies against and partially encircles the upper surface of the lower end portion of the handle bar. These end portions are then secured together by the nut and bolt couplings 64 and 66, the bolt 64 passing through the terminal portion 38 of the frame bar and through the handle bar and the bolt 66 passing through the upper end 36 of the frame bar and through the terminal portion 62 of the handle bar. Thus there is provided a very strong joint and the entire structure is made much more rigid and given greater strength than it would have by bending and shaping the frame part and handle part from a single piece of tubing.

The bolts 64 and 66 are also utilized for attaching to the top or front side of the frame structure, a hook member which is generally designated 68. This hook member comprises a back portion 70 and the bill portion 72. The back portion 70 is apertured to receive the shank of one of the supporting bolts and it is also shaped to lie against either the curved top surface of the terminal portion 38 to have the bolt 64 extended therethrough or to lie against the curved top and forwardly facing surface of the end portion 36 of the frame bar to be secured in place by the lower bolt 66. Thus the hook 68 is adapted to have two working positions at the top of the frame.

The upper end portion 60 of the handle bar is directed upwardly and rearwardly when the frame is in a vertical position and may have placed thereon a suitable hand grip 74 of rubber, plastic, or any other suitable material.

The second exemplification or embodiment of the invention, hereinbefore referred to and generally designated 12, has a frame which in association or combination with the axle structure also is of substantially triangular form and the frame of this second embodiment is generally designated 114.

The frame 114 is mounted upon running gear generally designated 116 and which comprises an axle 120 having mounted upon the ends thereof the wheels 122. These wheels are preferably of the same design or construction as the wheels 22 hereinbefore referred to and accordingly it is believed that the specific description of the same is not required.

The wheels 122 are mounted to rotate freely on the axle 120 and are maintained against detachment therefrom by a suitable collar 130 positioned on the axle upon the outer side of the wheel.

The frame 114 embodies the two upwardly converging bars 140 and 140a preferably formed of tubular material. The lower ends of these bars are flattened as at 142 and provided with apertures 144 through which the axle 120 passes. Thus the axle may turn freely in the apertures 144 as well as having free rotation in and relative to the hubs of the wheels 122.

In this second embodiment of the invention it will be seen that there is no central bar corresponding to the bar 32 but one of the two convergent bars here illustrated as the bar 140a, is of greater length than the bar 140 and continues upwardly into the center bar portion 136.

The extended portion 136 of the bar 140a is substantially straight and terminates in the short part 138 which is transversely arcuate and longitudinally channeled in a manner corresponding to the part 38.

The upper end of the bar 140 also terminates in a portion 146 which is transversely arcuate or curved and longitudinally channeled and this part 146 is positioned against the lateral side of the portion 136 and secured thereto in a suitable manner as, for example, by means of a bolt 148 which passes through the parts.

The numeral 154 designates the handle bar for the second embodiment and this handle bar is of substantially the same form as the bar 54, having a generally straight middel portion 156 and the oppositely angled end parts or portions 158 and 160 so as to have a substantially ogee curvature as hereinbefore described with respect to the first mentioned handle bar.

The lower part 158 of the handle bar 154 is formed to have the terminal portion 162 of transversely arcuate and longitudinally channeled construction.

As shown the upper end portion 136 of the bar 140 and the lower end portion of the handle 154 are coupled together to form a strong rigid joint by means of the overlapping relationship of the parts 138 and 162.

The numeral 168 generally designates a hook of the same character as the hook 68 hereinbefore referred to and it will be seen that this hook in the second embodiment may be readily secured in position by the upper bolt 164 or the lower bolt 166, which bolts function to secure together the overlapping end portions of the illustrated parts.

It will be seen from the foregoing description that in the first embodiment of the invention the hook 68 is disposed upon the upwardly and rearwardly inclined angled portion 58 between the upper end part 36 of the bar 32 and the lower end part 62 of the handle bar, and thus when the frame 14 is in vertical position the hook will be somewhat rearwardly of the frame as best shown in FIG. 6.

FIGS. 3, 4, and 6 illustrate the use of the hook to pick up a container such as a bucket or a can where the bucket may have a bail handle and the can may have a pair of pivoted handles upon the opposite side thereof.

In FIG. 3 the can or receptacle is generally designated R and one of the side handles thereon is designated h. The same type of receptacle is illustrated in FIG. 6.

In FIG. 4 the receptacle R' is shown as having a bail handle b.

In the operation of picking up either of the receptacles the truck 10 is tipped forwardly as shown in FIG. 3 to a position where the handle h or the bail b can be conveniently engaged over the hook 68. The truck is then swung back, being pivoted on the axle 20 so as to bring the hook 68 back to a position where it is behind the vertical plane of the frame 14, as shown in FIG. 6 and then by further swinging the handle or handle bar rearwardly to rearwardly incline the truck as shown in FIG. 4 the receptacle will be pulled into a position where the lower part will come to rest in the cradle 18 and the receptacle will be elevated from the ground and may then be easily transported.

In the use of the second embodiment of the truck shown in FIGS. 9 and 10 there is no center bar in the triangular frame 114, and when the truck is in a position where the frame is in substantially vertical plane, the hook 168 will project forwardly of such plane. In picking up a receptacle as shown in FIG. 10 the upper part of the truck will be tipped forwardly in the position shown, in the same manner as the truck 10, forming the first embodiment, is tipped so that the handle of the receptacle can be engaged with the hook. By then swinging the upper part of the truck back to a rearwardly inclined position the receptacle will be brought in where it may rest aginst the axle. However in this second embodiment a shorter or smaller receptacle can be swung to a position where the bottom will overlie the axle 120 so that it may either rest directly upon the axle or the lower part of the receptacle may be suspended in the lower part of the angle formed by the frame parts 140 and 140a.

In the first embodiment the arcuate cradle 18 will hold a receptacle against any lateral turning or swinging while it is being transported, as will be readily apparent. With the second embodiment lateral movement resting upon the axle or with its lower end in the angle between the side members of the frame, will also be held against lateral movement. Also it will be apparent that the hand trucks in both embodiments may be conveniently used for transporting bodies other than pails or buckets or larger cans. While the trucks are designed particularly for handling receptacles of this type it will be apparent that they may be used for transporting other bodies such as large bundles or bags of material by the use of suitable cords or ropes to maintain such bodies in position or suspended from the hooks and in the use of the truck structure 10 such bodies would be maintained, when suspended from the hook 68, in the cradle 18 or in the use of the second embodiment 12 the body may be suspended directly from the hook 168 to lean against the axle 120 or it may be rested upon the top of the axle and secured to the hook in an obvious manner.

By the provision of means for moving the hook 68 or the hook 168 up or down on the upper part of the frame it will be seen that provision is made for mounting receptacles of different sizes and having bails of different size or handles in different locations, upon either truck structure.

It will also be apparent that the hook 168 may be inverted and secured by either of the two bolts 164 or 168 so that the bill of the hook can be engaged over the top edge of an open top receptacle when the latter is resting upon the axle 120.

In illustrating the dis-assembled truck in the carton or box C, forming FIG. 1, it will be noted that the parts of the first described embodiment of the truck, which is generally designated 10, have been shown. It will be apparent however that the second embodiment generally designated 12 may similarly be dis-assembled and packed in the carton for sale.

The several elements of the truck 10 have been designated by their reference numbers in FIG. 1 and there is also shown in this figure a container in the form of a bag or the like, generally designated B in which the loose elements such as nuts and bolts, axle caps and hook may be placed to accompany the other elements in the carton.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or that form their functional as well as conjointly cooperative equivalents, are therefore intended to be embraced by those claims.

We claim:

1. A hand truck of the character stated, comprising running gear embodying an axle and a pair of wheels thereon, a frame having a forward side and supported on the axle to extend substantially vertically in the use of the truck and embodying a pair of elongate upwardly converging parts having their divergent lower ends attached to said axle, an elongate handle bar having a straight lower end portion connected to said parts at and above the convergent ends thereof and disposed in alignment with and perpendicular to said axle, said handle bar having a first angle therein above the said ends of the frame parts and extending in a second portion from said angle obliquely upwardly away from said forward side of the frame and then having a second angle therein and extending from the latter angle in a third portion which is approximately parallel with the said lower end portion, a hand grip carried by the upper end of the handle bar, and a hook member attached to the handle bar above the convergent ends of the frame parts upon the forward side of the truck.

2. The invention according to claim 1, wherein the said straight lower end portion of the handle bar comprises an integral continuation of one of the first frame parts and the adjacent end of the other frame part having a terminal portion engaging said straight lower end portion of the handle bar, and means rigidly securing said terminal portion to the engaged handle portion.

3. A hand truck of the character stated, comprising running gear consisting of an axle and wheels rotatably mounted on the ends thereof, a frame on said axle comprising a pair of elongate upwardly converging members attached at their lower ends to the axle and secured together at their convergent upper ends, one of said members having an obtuse angle adjacent to its upper end, a portion of said one member above the angle extending perpendicular to the axle and disposed in a common plane with the axle and the converging members, the said portion of said one member terminating at its upper end in a transversely curved longitudinally channeled part, an elongate hande bar part having a lower end portion terminating in a transversely curved longitudinally channeled part, the said lower end portion of said handle bar part and the upper end portion of said one member being in overlapping relation with the transversely curved channeled part of the handle bar member and the transversely curved channeled part of the said other one member each receiving an opposing portion of the other, spaced upper and lower bolt members passing through said overlapping portions and rigidly securing the same together, and a hook member mounted upon one of said bolt members on the forward side of the frame.

References Cited by the Examiner

UNITED STATES PATENTS

| | | | |
|---|---|---|---|
| 772,883 | 10/04 | Hines | 214—384 |
| 1,517,901 | 12/24 | Gill | 214—384 |
| 2,251,591 | 8/41 | Looney | 214—384 |
| 2,774,608 | 12/56 | Sanders. | |
| 2,881,017 | 4/59 | Millar | 287—103 |

HUGO O. SCHULZ, *Primary Examiner.*

GERALD M. FORLENZA, *Examiner.*